UNITED STATES PATENT OFFICE.

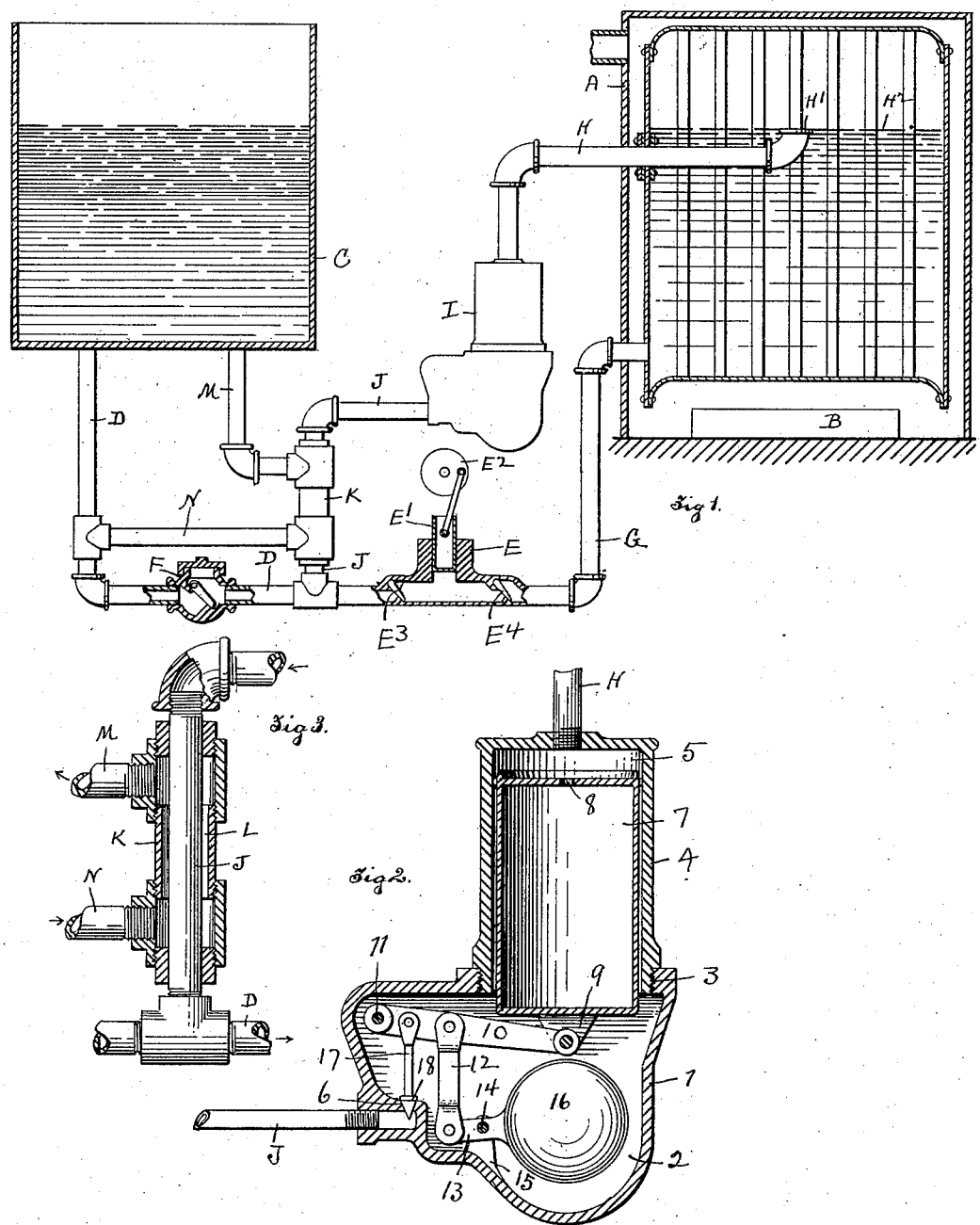

GEORGE I. ROCKWOOD, OF WORCESTER, MASSACHUSETTS.

APPARATUS FOR MAINTAINING THE WATER-LINE IN STEAM-BOILERS.

SPECIFICATION forming part of Letters Patent No. 686,342, dated November 12, 1901.

Application filed June 3, 1901. Serial No. 62,892. (No model.)

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Apparatus for Maintaining the Water-Line in Steam-Boilers, of which the following is a specification, accompanied by drawings forming a part of the same, in which—

Figure 1 represents a side elevation of an apparatus for maintaining the water-line in steam-boilers, parts being shown in sectional view. Fig. 2 is a central vertical sectional view of the trap, which is opened and closed by the action of a counterbalanced float; and Fig. 3 represents the pipe connecting the trap and pump, with the water-jacket thereon shown in sectional view.

Similar reference letters and figures refer to similar parts in the different views.

My invention relates to an apparatus for maintaining the water-line in a steam-boiler, said apparatus comprising a pump by which water is fed into the boiler, a tank from which water is supplied to the pump, and a trap between the boiler and pump, said trap being intermittently opened and closed by means of a counterbalanced float, as determined by the water-line in the boiler; and my invention consists in the construction and arrangement of parts, as hereinafter described, and pointed out in the annexed claims.

Referring to the accompanying drawings, A denotes a steam-boiler; B, the burner; C, the tank from which water is supplied to the boiler; D, a pipe leading from the tank to a force-pump E and containing a check-valve F, which allows water to flow from the tank to the pump, but prevents its return.

G is a pipe leading from the force-pump E to the boiler. The force-pump may be of any known type now in use. In the present instance it consists of a piston E', reciprocated by a crank E² and provided with valves E³ E⁴.

H denotes a pipe entering the boiler and having its inner end H' terminating just below the desired water-line H². The pipe H connects the boiler with a trap I. (Shown in central sectional view in Fig. 2.) The trap I is connected with the pipe D between the pump E and check-valve F by means of a pipe J. A portion of the pipe J is provided with a jacket K, inclosing a water-space L, connected at its upper end by a pipe M with the tank and connected at its lower end by a pipe N with the pipe D between the tank C and the check-valve F, so that water is free to flow from the tank through the pipes D and N to the water-space L and from the water-space L through the pipe M back to the tank.

The tank I consists of a shell or case 1, inclosing a chamber 2 and having an opening 3 at its upper side to receive the cylindrical shell 4, inclosing a chamber 5, which communicates through the pipe H with the interior of the boiler at the water-line. The shell 1 is provided with an opening 6, communicating with the pipe J. Within the chamber 5 is a cylindrical hollow float 7, having an opening 8 at its upper end to admit water to the float and provided at its lower end with a lug 9, which is pivoted to the free end of a lever 10. The lever 10 is pivoted on a spindle 11, held in the case 1, and is pivotally connected by a link 12 with one end of a lever 13, pivoted on a stud 14, held in a bracket 15, projecting from the inside of the case 1. The opposite end of the lever 13 carries a weight 16, which acts as a counterbalance to the float 7. Pivoted to the lever 10 is a valve-stem 17, carrying at its lower end a conical valve 18, arranged to close the opening 6 as the float 7 falls. The weight 16 is heavier than the hollow float 7 when the latter is empty, but is lighter than the float 7 when the latter is filled with water.

The operation of my improved apparatus is as follows: The hollow float 7 is filled with water, which causes the float to descend and close the opening 6. The pump E is set in motion to force water from the tank C into the boiler, and heat is applied by the burner B to produce a steam-pressure, which passes freely through the pipe H into the tank I. Whenever the water in the boiler rises above the water-line H², it will flow through the pipe H into the trap, filling the chamber 2 and rising in the chamber 5 around the hollow float 7 until the buoyancy of the water in the tank sustains enough of the weight of the water in the hollow float to allow the counterweight 16 to fall, thereby raising the float 7 and lifting the valve 18 against the pressure of the steam on the upper end of it to open the passage between the trap and the pump E, when the water flowing through the pipe J to the pump, with the steam-pressure of the boiler behind it, which is greater than the pressure of the water in the tank, closes the check-valve F and causes the water fed from the trap I to be forced back by the pump E into the boiler. If, however, the water in the boiler falls below the water-line $H^2$, steam will again flow through the pipe H, and as soon as the water in the trap falls sufficiently in the cylindrical chamber 5 the combined weight of the float 7 and the water contained therein being greater than that of the counterweight 16 will cause the hollow float 7 to descend, lifting the counterweight 16 and carrying the valve 18 into the opening 6, thereby closing the passage between the chamber 2 and the pipe J, causing the pipe J to be emptied of water by the action of the pump, and any steam forming in the heated pipe J will be condensed by the cold water in the water-space L, thereby instantly relieving the pressure of the water from the tank C, and opening the check-valve and flow to the pump.

What I claim as my invention, and desire to secure by Letters Patent, is—

1. In an apparatus for maintaining the water-line in a steam-boiler, the combination of the following instrumentalities: a source of water-supply, a pump by which water is taken from said water-supply and forced into the boiler, a check-valve between the supply and the pump, a trap communicating with the boiler at the water-line and with the pump at the pipe leading from the check-valve to the pump, said trap having a valve by which the passage from the trap to the pump is closed, a hollow float filled with water and operatively connected with said valve, and a counterbalance arranged to instantly lift said float and open the valve when the weight of said counterbalance becomes greater than the unsupported weight of said water-filled float, substantially as described.

2. In an apparatus for maintaining the water-line in a steam-boiler comprising a source of water-supply, a pump, a check-valve between the pump and the water-supply, a pipe communicating with the boiler on the water-line, and with the pump between it and the check-valve, a valve in said pipe, means for opening and closing said valve determined by the water-line in the boiler, and a water-jacket by which said pipe is cooled, substantially as described.

3. The combination with a steam-boiler of a source of water-supply, a pump, a check-valve between the pump and water-supply, a passage leading from the steam-boiler at its water-line to said pump, and between it and said check-valve, a trap included in said passage and comprising a valve by which the passage is closed, and a counterbalanced float connected with said valve, and a water-jacket by which said passage is cooled between said trap and the pump, substantially as described.

4. The combination in an apparatus for maintaining the water-line in a steam-boiler, of a tank, a pump by which water is forced from the tank to said boiler, a check-valve between the pump and tank, a pipe leading from the boiler at the water-line to said pump, means for closing said pipe determined by the water-line in the boiler, a jacket inclosing an annular space around said pipe, with the upper and lower ends communicating with said tank, substantially as described.

Dated this 31st day of May, 1901.

GEORGE I. ROCKWOOD.

Witnesses:
RUFUS B. FOWLER,
FLORENCE C. COOK.